A. L. LAMAR.
PREHEATING DEVICE FOR INTERNAL COMBUSTION ENGINES.
APPLICATION FILED MAR. 2, 1917.
1,411,633.
Patented Apr. 4, 1922.
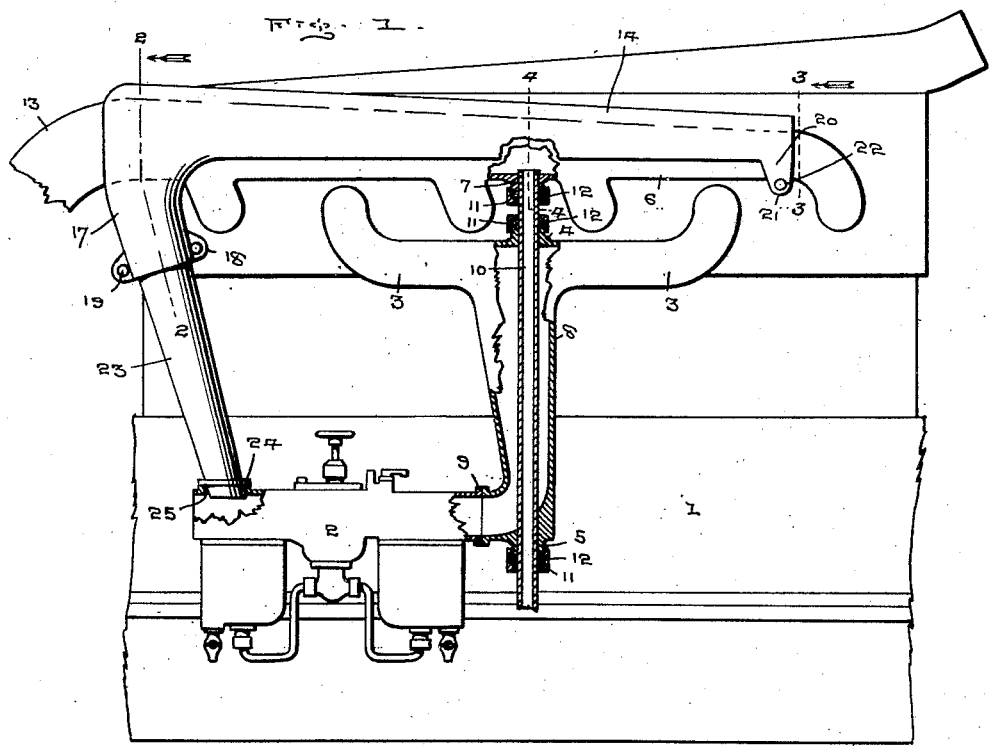
Inventor
Alexis L. Lamar
By
W. J. FitzGerald & Co.
Attorneys

UNITED STATES PATENT OFFICE.

ALEXIS L. LAMAR, OF PITTSBURG, KANSAS.

PREHEATING DEVICE FOR INTERNAL-COMBUSTION ENGINES.

1,411,633.  Specification of Letters Patent.  Patented Apr. 4, 1922.

Application filed March 2, 1917. Serial No. 151,978.

*To all whom it may concern:*

Be it known that I, ALEXIS L. LAMAR, a citizen of the United States, residing at Pittsburg, in the county of Crawford and State of Kansas, have invented certain new and useful Improvements in Preheating Devices for Internal-Combustion Engines; and I do hereby declare the following to be a full, clear, and exact description of the invention, such as will enable others skilled in the art to which it appertains to make and use the same.

My present invention relates to a novel pre-heating device and is more particularly adapted for internal combustion engines employing coal oil as fuel.

An object of the invention is to provide a simple and effective device for transferring heat from the exhaust to the fuel intake mixture.

Another object is to provide a device of the above type in which the heat transfer is effected without the spent or exhaust gases or any part thereof becoming admixed with the intake charge.

Another object is to provide a device of the above type which can be installed with particular facility on certain engines of conventional type.

These and other objects and advantages of my invention will more fully appear as the nature of the invention is more clearly understood from the combination and arrangement of the parts thereof as described in the following specification, defined in the subject matter of the claims, and illustrated in the several views in the accompanying drawings, in which, Figure 1 is a side elevation of an internal combustion engine with its carbureter, intake manifold and exhaust manifold shown as partly broken away and partly in section, showing my invention in applied operative position thereon.

Figure 2 is a vertical transverse sectional view, on line 2—2 of Figure 1 and looking in the direction of the arrow, showing the detailed construction of the air heating hood and its conducting pipe.

Figure 3 is a vertical transverse sectional view, on line 3—3 of Figure 1 and looking in the direction of the arrow, showing the air intake end of the air heating hood and the manner of securing the same upon the exhaust manifold of the engine.

Figure 4 is a vertical transverse sectional view, on line 4—4 of Figure 1, showing the means which I employ for securing the vaporizing tube within the exhaust manifold and correspondingly through the walls of the intake manifold and its leg.

Referring to the drawings, wherein similar reference characters are employed to designate corresponding parts throughout the several views, 1 denotes any suitable form of internal combustion engine, and 2 the carbureter, which carbureter is the same embodied in my pending application filed December 19, 1916, Serial Number 137,746, and which I employ in combination with the structures of my present invention.

The internal combustion engine selected for purposes of illustrating my present invention is a four-cylinder block cast engine having the exhaust and intake passages and manifolds arranged as in a well-known type of Ford motor now on the market. As shown in the drawings, the exhaust manifold 6 is arranged horizontally and is connected with the four exhaust passages of the four cylinders. The intake manifold 3 is arranged horizontally below the exhaust manifold and connects with 2 intake passages in the casting, each serving two of the cylinders. The intake manifold is provided with a downwardly extending portion of considerable length communicating with the manifold approximately midway of the horizontal portions leading to the cylinder intakes. The downward intake extension is formed with a lateral intake.

An important feature of my invention consists in combining the intake manifold with an auxiliary heating device for vaporizing the mixture in its passage through the extension 8. For this purpose, I arrange an auxiliary exhaust conduit consisting of a pipe 10 tapped into the under side of the exhaust manifold, preferably at a point midway between the two intermediate exhaust outlets which it will be noted are close together and therefore cause this portion of the exhaust manifold to be highly heated. I preferably use a straight tube extending directly downward through the intake extension 8 and out through the bottom thereof. This tube is of proper size to carry the limited volume of exhaust necessary for producing the desired heating effect upon the mixture.

The pipe 10 may be tapped directly into the castings where the invention is to be applied to existing standard equipment but if special manifolds are to be previded, I preferably form the intake manifold 3 with the upper and lower bosses 4 and 5 and the exhaust manifold 6 with the boss 7. In such case the tube 10 has its upper end operatively maintained within the boss 7 by the packing gland 11 having suitable packing 12 therein to provide a tight joint when the gland 11 is screwed upon the end of the boss 7 of the exhaust manifold 6. The vaporizing tube 10 is passed through the boss 4 of the intake manifold 3 and thence onwardly through the boss 5 at the lower end of the leg 8 of the intake manifold 3 and extends in any suitable manner for connecting the tube 10 with the exhaust manifold 6 at any suitable point. The tube 10 is secured in the bosses 4 and 5 of the intake manifold 3 and its leg 8 by similar packing glands 11 and packing 12 to also provide tight joints when the glands 11 are screwed upon the respective bosses 4 and 5 of the intake manifold.

To supply heated air to the carbureter 2 I provide the casing or hood 14, which is preferably semi-circular in cross section. Upon the lower edges of the hood 14 are the inturned flanges 15 for impinging the sides of the exhaust manifold 6 when the hood 14 is mounted thereon. One end of the hood or casing 14 is provided with a plurality of inturned fins or fingers 16 to provide a grating at the air intake end of the hood 14, the opposite end being provided with the elbow 17 which is adapted to encircle the exhaust pipe 13 and has its divided members provided with the registering apertured ears 18 suitably secured together by the bolts 19 or other suitable securing means. These ears provide one of the means for securing this end of the hood 14 upon the exhaust pipe 13 and portion of the exhaust manifold 6, and to secure the air intake end of the hood 14 upon the latter I provide this end of the hood 14 with the straps 20 provided with the registering apertured ears 21 which are secured together by the bolt 22. For conveying the heated air from the hood 14 to the carbureter 2 I provide the conducting pipe 23, preferably of frusto-conical formation having its wider end secured within the lower end of the elbow 17 by the impinging action of the divided portions of the elbow 17 when the ears 18 are secured together by the bolts 19. The lower and smaller end of the conducting pipe 23 is provided with the annular collar 24 slightly remote from this end of the pipe 23 so as to form a shoulder upon the pipe 23 for resting upon the annular rib of the hot air intake opening 25 of the carbureter 2 when the lower end of the pipe 23 projects through the opening 25 of the carbureter 2 and into the air intake of the carbureter, the lower end of the pipe 23 being suitably secured within the opening 25 of the carbureter 2 and in a manner to provide a fixed tight joint thereat.

The operation of my invention and the results and advantages attained thereby will be briefly described as follows:—

The carbureter which I preferably employ is the same covered by my copending application above referred to, which carbureter is constructed for efficiently employing either gasolene or kerosene either individually or collectively as desired, but I have primarily designed this carbureter for the purpose of employing kerosene or coal oil as a fuel after the engine has been started with gasolene. After the engine has been started and becomes sufficiently heated for the employment of kerosene or coal oil to provide an explosive mixture, the air, which is drawn by the suction of the engine through the grating 16 at the air intake end of the hood 14, is heated in its passage through the hood by the exhaust manifold 6 of the engine. The air is heated to a very high degree as it travels along the entire length of the exhaust manifold 6 and a portion of the exhaust pipe 13. The heated air is then drawn through the elbow 17 and the conducting pipe 23 to the air intake conduit or compartment of the carbureter 2, where it becomes thoroughly mixed with the injected kerosene or coal oil. At the same time the intensely heated air vaporizes the kerosene to a high degree and the mixture passes into the leg 8 of the intake manifold 3 from the carbureter 2 in an efficient vaporized condition. In order to provide an extremely efficient gaseous mixture for the engine under all conditions of use, particular conditions of bad carbureter adjustment, cold weather or inferior quality of the fuel, I preferably provide the above described intake heater consisting of the auxiliary exhaust conduit 10, which may be formed of copper, if desired. It extends downward from the exhaust manifold 6, transversely through the intake manifold 3 and lengthwise of the downward extension 8 thereof. A portion of the exhaust gases from the exhaust manifold 6 will escape through this tube thereby heating the tube to a degree required for further perfecting the vaporization of the fuel in the draft mixture during its passage from the carbureter, through the upright portion 8. This has the advantage that the incoming draft of explosive mixture in rising through the upright portion 8 travels toward progressively hotter portions of said pipe, the top of the pipe naturally being hottest and the bottom coolest. Moreover, whatever heat is derived from the pipe is imparted equally to the entire body of the draft before it splits on its way to the several cylinders of the motor. This is of great practical importance because, as is well-known, uniformity of the mixture proceeding to all of the cylinders, is as essential to smooth running as proper vaporization is to power development. For instance, if the pipe 10 were arranged horizontally through the intake manifold instead of vertically through the intake extension, the part of the draft proceeding toward the hotter end would be much more highly heated than the part proceeding toward the cooler end.

Whilst I have shown the intake manifold 3 and the lower end of its leg 8 formed with the bosses 4 and 5, and the exhaust manifold 6 formed with the boss 7 for operatively mounting the vaporizing tube 10, this applies primarily during the construction of the engine, as the vaporizing tube 10 may be efficiently mounted upon the intake manifold and exhaust manifold of the engines now in use, by forming openings through the respective walls of the intake manifold and exhaust manifold in lieu of the bosses 4, 5 and 7, which I preferably employ, and brazing, welding, fusing, soldering, or otherwise securing the contiguous portions of the tube 10 within the respective openings thus formed.

I desire it to be understood that my invention is not restricted to the exact manner of forming the hood 14 and its elbow 17 and securing the same upon the exhaust manifold 6 as herein shown and described, as I may provide the rear end of the hood 14 with the straps 20, ears 21 and bolt 22 for securing this end of the hood 14 upon the exhaust manifold 6 in the same manner that the front or air intake end of the hood 14 is secured to the manifold 6, and in this instance the elbow 17 will project from a side of the hood 14 adjacent its rear end and will convey the heated air from the hood 14 to the carbureter 2 with equal efficiency.

Having described my invention, what I claim as new and desire to secure by Letters Patent, is:—

1. The combination with an internal combustion engine, of a lateral exhaust conduit and an intake manifold located directly below the exhaust conduit and comprising a lateral intake conduit having a downwardly extending passage formed with a lateral inlet at the lower end thereof, a second exhaust conduit for heating the mixture in the intake, said second conduit consisting of a straight length of pipe tapping the underside of said exhaust conduit and extending straight through said downwardly extending passage through aligned openings formed in the top and bottom of the intake manifold.

2. An internal combustion engine provided with a lateral exhaust conduit and an intake manifold located directly below the exhaust conduit and comprising a lateral intake conduit having a downwardly extending passage formed with a lateral inlet at the lower end thereof; in combination with a second exhaust conduit for heating the mixture in the intake, said second conduit consisting of a straight length of pipe, tapping the underside of said exhaust conduit and extending straight through said downwardly extending passage, through aligned openings formed in the top and bottom of the intake manifold and freely removable through said bottom opening, and securing means for the pipe arranged to seal the joints between the pipe and the several walls traversed thereby.

In testimony whereof I have signed my name to this specification in the presence of two subscribing witnesses.

ALEXIS L. LAMAR.

Witnesses:
CHARLES H. MILLER,
MARGARET WEES.